Oct. 26, 1937.     A. TIMMERBEIL     2,097,108
DEVICE FOR CONNECTING THE ENDS OF BELTS, STRAPS, AND THE LIKE
Original Filed Nov. 14, 1934
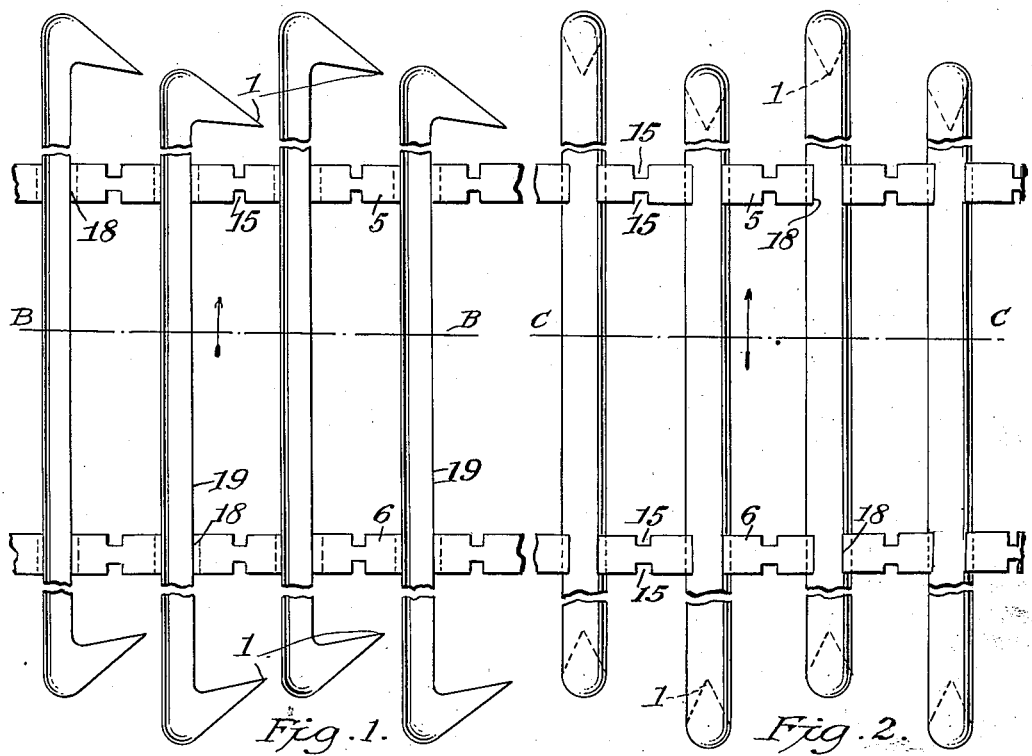
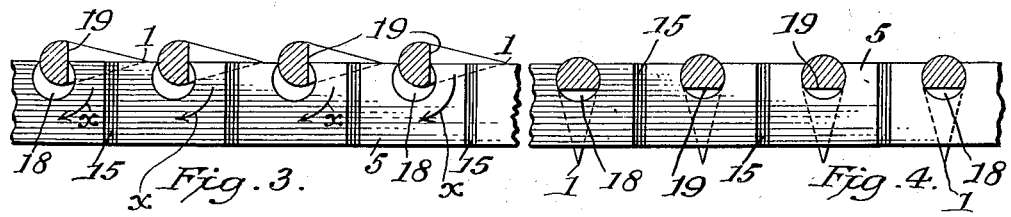
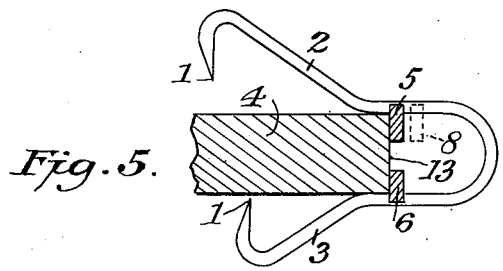
INVENTOR,
Alfred Timmerbeil,
BY Frank S. Appleman,
ATTORNEY.

Patented Oct. 26, 1937

2,097,108

UNITED STATES PATENT OFFICE 2,097,108

DEVICE FOR CONNECTING THE ENDS OF BELTS, STRAPS, AND THE LIKE

Alfred Timmerbeil, Arnhem, Netherlands

Original application November 14, 1934, Serial No. 753,028. Divided and this application February 8, 1937, Serial No. 124,747. In the Netherlands December 15, 1933

3 Claims. (Cl. 24—33)

This invention relates to devices for connecting the ends of belts, straps and the like, and the method of making same, the said invention being divided from my application Serial Number 753,028 filed November 14, 1934.

In assembling the hooks of the present invention, it is an object to produce means by which the hooks may be anchored in their supporting or carrying members which will prevent their disengagement with said carrying members. Specifically, the method of assembling the hooks and carrying members is to provide undercut recesses in the said carrying members and shape the hooks so that they are reduced in size on one cross section, as compared with the size at another cross section, a condition which permits the reduced cross sectional portions to enter the undercut recesses and when turned by 90° around their longitudinal axes, the larger cross sectional area of the hooks will prevent their dislodgment from the recesses by being lifted therefrom.

It is another object of this invention to increase the useful life of the belt connecting devices.

With the foregoing and other objects in view, the invention consists in the details of construction, and in the arrangement and combination of parts to be hereinafter more fully set forth and claimed.

In describing the invention in detail, reference will be had to the accompanying drawing forming part of this application, wherein like characters denote corresponding parts in the several views, and in which—

Figure 1 illustrates a plan view of the belt fastener with the hooks in one position while being assembled with the carrying members or strips;

Figure 2 illustrates a plan view showing the hooks in a different position of adjustment secured to the carrying members;

Figures 3 and 4 are sectional views on the lines B—B of Fig. 1 and C—C of Fig. 2, respectively; and Figure 5 illustrates a sectional view showing the assembly when the hooks are bent transversely to form loops.

In the drawing the hook carrying members or strips 5 and 6 are preferably rectangular in cross section and when the assembly is formed into a belt fastener have their side surfaces parallel to one another as shown in Figure 5. Preferably, the two strips or carrying members 5 and 6 lie in the same plane, but as indicated by broken lines 8 in Fig. 5, one carrying member may be displaced with relation to the other carrying member. The inwardly projecting members 5 and 6 form abutments for the end face 13 of a belt or strap 4 and, in this way the end of the belt or strap is prevented from entering too far into the loops produced by bending the hook members, and the said loops in known manner may receive the jointing pin (not shown).

Between the notches for receiving the hooks, the carrying members have grooves or incisions 15 in order that the carrying members may be severed in appropriate lengths by simply breaking the carrying members without any special tools such as shears or the like.

The individual hooks are advantageously secured in the carrying members by having the carrying members or cross members 5 and 6 provided with recesses 18 on their outer edges, which recesses are undercut. In the example illustrated, the circumference of the recesses 18 is about three quarters of a circle in order that the recesses widen inwardly and the openings at the edges of the carrying members are restricted as compared with the undercut diameter of the openings and therefore a narrower insertion opening is formed for the wire hooks.

The wire hooks 2 and 3 have non-circular cross section somewhat similar to the cross sectional form of the recesses 18 and in the example illustrated, the hooks are flattened on their inner surfaces as at 19. As illustrated in Figs. 1 and 2, the hooks are inserted into the recesses 18 in such a way that their tips 1 point in the direction of the length of the carrying members or strips 5 and 6 and it will be seen that the insertion of the hooks is only possible when they are in this position on account of the fact that the small diameter of the hook corresponds to the breadth of the insertion openings.

The hooks are fixed and retained by being turned 90° in the direction of the arrow $x$ about their longitudinal axes, as indicated in Figures 3 and 4, so that the cross section of the hooks practically fills the recesses 18, whereby the hooks are prevented from being lifted from the recesses. At the same time the hooks are gripped so that longitudinal movement is also impossible. The gripping or fastening action can be enhanced by the hooks being roughened at least on the parts coming in contact with the walls of the recesses 18. The wire hooks secured to the carrying members or cross strips 5 and 6 are then brought to the V-form (Fig. 5) by pressure on the parts situated between the cross bars.

The cross section of the wire hooks 2 and 3 and the corresponding recesses 18 may be of other forms than those shown. The important feature is that the recesses 18 are undercut and that the hooks are of such cross section that they can be inserted directly into the recesses but are secured therein by rotation about their longitudinal axes. The hooks 2 and 3 need not be of non-circular cross section along their entire length as it may be sufficient for them to be merely of non-circular cross section at the parts which cooperate with the recesses 18 of the carrying or cross members 5 and 6.

I claim:

1. A device for connecting together the ends of belts, straps or the like, comprising carrying strips having recesses the entrance to which is smaller than the diameter of the recesses, hooks having portions between their ends adapted to enter the restricted openings of the recesses and having their surfaces engaging the walls of the enlarged portions of the recesses to prevent their withdrawal from the recesses through the said restricted openings.

2. A device for connecting together the ends of belts, straps or the like, in which the hooks are flattened on the inner side of the portion situated between the two points and in which transverse strips have undercut recesses adapted to securely clamp said hooks when they have been turned 90° about their longitudinal axes.

3. A device for connecting together the ends of belts, straps or the like, in which transverse strips have recesses each forming three quarters of a circle, and the portions of the hooks intermediate the tips coming into contact with the recesses are of non-circular cross section and roughened.

ALFRED TIMMERBEIL.